(12) United States Patent
Kitani et al.

(10) Patent No.: US 8,590,593 B2
(45) Date of Patent: Nov. 26, 2013

(54) ROLLER SHADE APPARATUS FOR VEHICLE

(75) Inventors: Takashi Kitani, Nagoya (JP); Yoshitaka Nakamura, Kariya (JP); Takanori Ninomiya, Kariya (JP); Naoto Kamioku, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 162 days.

(21) Appl. No.: 12/801,755

(22) Filed: Jun. 23, 2010

(65) Prior Publication Data

US 2010/0326607 A1    Dec. 30, 2010

(30) Foreign Application Priority Data

Jun. 29, 2009 (JP) ................................. 2009-153235

(51) Int. Cl.
*B60J 1/20* (2006.01)

(52) U.S. Cl.
USPC .................. 160/370.22; 160/273.1; 160/264; 296/97.8

(58) Field of Classification Search
USPC ................. 160/370.22, 273.1, 271, 272, 265; 296/97.5
See application file for complete search history.

(56) References Cited

U.S. PATENT DOCUMENTS

| | | | | |
|---|---|---|---|---|
| 4,707,018 A | * | 11/1987 | Gavagan | 296/152 |
| 4,825,921 A | * | 5/1989 | Rigter | 160/23.1 |
| 7,114,766 B2 | * | 10/2006 | Becher et al. | 296/214 |
| 7,114,767 B2 | * | 10/2006 | Grimm et al. | 296/214 |
| 7,730,630 B1 | * | 6/2010 | Lamb et al. | 33/757 |
| 2006/0027347 A1 | * | 2/2006 | Boehm et al. | 160/273.1 |
| 2008/0216971 A1 | | 9/2008 | Rockelmann et al. | |
| 2008/0277077 A1 | | 11/2008 | Rockelmann et al. | |
| 2009/0145559 A1 | | 6/2009 | Glasl et al. | |
| 2009/0178771 A1 | * | 7/2009 | Lin | 160/370.22 |

FOREIGN PATENT DOCUMENTS

| | | |
|---|---|---|
| DE | 20 2006 003 831 | 6/2006 |
| DE | 20 2006 015 107 | 1/2007 |
| DE | 10 2006 062 542 | 7/2008 |
| DE | 10 2009 036 606 | 8/2010 |
| JP | 4-98999 | 8/1992 |
| JP | 3130336 | 2/2007 |

(Continued)

OTHER PUBLICATIONS

Office Action for Japanese Patent Appl. No. 2009-153235 dated Aug. 6, 2013.

*Primary Examiner* — Blair M. Johnson
(74) *Attorney, Agent, or Firm* — Finnegan, Henderson, Farabow, Garrett & Dunner, LLP

(57) ABSTRACT

A roller shade apparatus for a vehicle includes a shade sheet placed selectively in wound-up and extended states, the wound-up state being established to uncover a light transmitting member mounted to the vehicle when the shade sheet is moved in an opening direction, the extended state being established to shield the light transmitting member when the shade sheet is moved in a closing direction, a pair of guide rails extending in the opening and closing directions, and guide belts slidably supported by respective guide portions of the guide rails along the opening and closing directions and connected to respective side end portions of the shade sheet, wherein each guide belt curved in the width direction includes a convex surface, a central portion of the convex surface is connected to each side end portion, and each guide portion includes a pair of lock portions locking side portions of the guide belt.

11 Claims, 10 Drawing Sheets

(56) References Cited

FOREIGN PATENT DOCUMENTS

| JP | 2008-024266 | 2/2008 |
| JP | 2009-505877 | 2/2009 |
| JP | 2009-510295 | 3/2009 |
| WO | WO 2010/022768 | 3/2010 |

* cited by examiner

FIG. 1
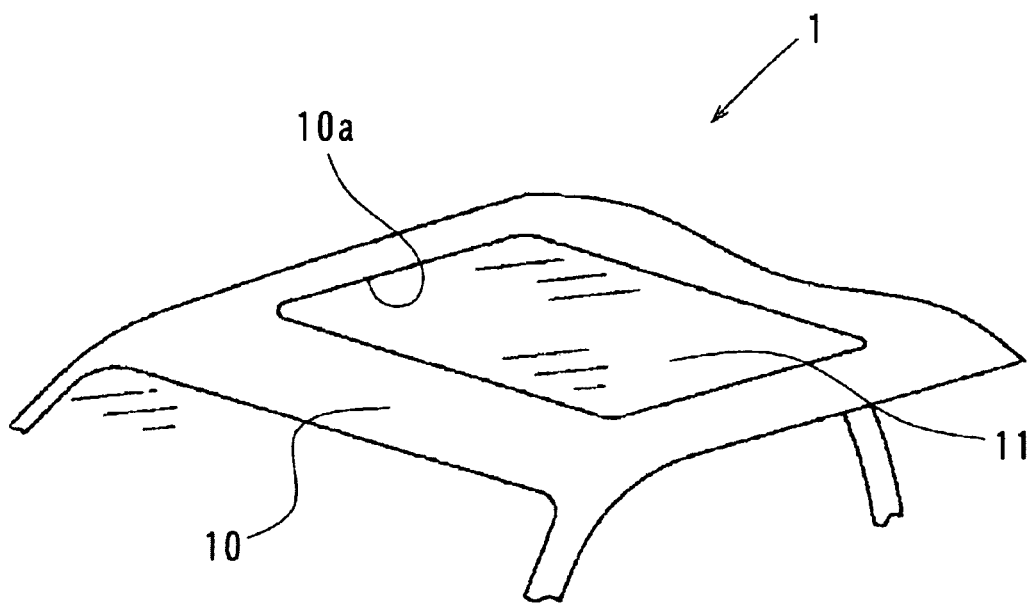
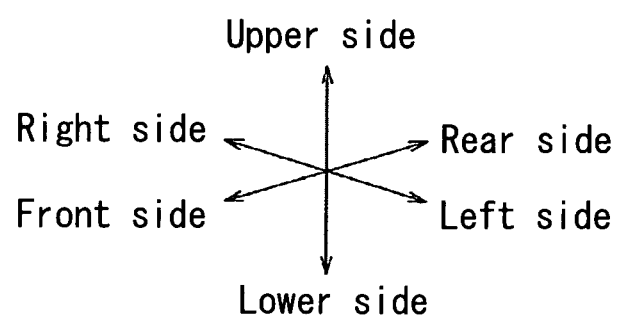

ROLLER SHADE APPARATUS FOR VEHICLE

CROSS REFERENCE TO RELATED APPLICATIONS

This application is based on and claims priority under 35 U.S.C. §119 to Japanese Patent Application 2009-153235, filed on Jun. 29, 2009, the entire content of which is incorporated herein by reference.

TECHNICAL FIELD

This disclosure relates to a roller shade apparatus for a vehicle, which shields a light transmitting member such as a roof panel arranged on the vehicle, by means of a shade sheet. In particular, the disclosure pertains to an electric roller shade apparatus.

BACKGROUND DISCUSSION

A known window blind for a sliding roof system arranged on a vehicle, disclosed in U.S. Pat. No. 7,114,767 B2 (hereinafter referred to as Reference 1) includes a flexible material, a pair of guide rails, and a guide element (guide strip).

The flexible material is positioned in wound-up and extended states. The flexible material serving as a shade sheet is moved in an opening direction to be arranged in the wound-up state to thereby uncover a light transmitting member arranged on the vehicle. The flexible material is moved in a closing direction to be arranged in the extended state to thereby shield the light transmitting member.

The pair of guide rails is arranged on the vehicle so that guide portions arranged to extend along a moving direction of the window blind may face each other. Further, each of the guide portions has a bottom wall portion extending in the moving direction of the window blind, an inner wall portion vertically formed from the bottom wall portion, an outer wall portion vertically formed at a further exterior side of the vehicle than the inner wall portion, and an extending portion extending from a lower end of the outer wall portion toward the center of the vehicle. Each edge portion of the window blind and the guide element are accommodated in an interior space (accommodating space) surrounded by the bottom wall portion, the inner wall portion, the outer wall portion, and the extending portion. The inner wall portion includes a leg (preventing portion) extending from a lower end of the inner wall portion toward the exterior side of the vehicle. The leg prevents the guide element from being loosened from the interior space of the guide portion.

The guide element extends along the moving direction of the window blind while being connected to the edge portion of the window blind in a longitudinal direction of the vehicle, thereby guiding the window blind to be movable along the guide portion.

In the conventional window blind described in Reference 1, the guide portion is configured so as to support one end of the guide element and to hold a connecting portion between the edge portion of the window blind and the other end of the guide element. The window blind is slidably moved along the guide portions. Accordingly, for example, when a tensile force is applied to the window blind, a stress due to the tensile force may concentrate on a slide portion between the window blind and the guide portions. Consequently, a sliding resistance may increase when the window blind is moved along the guide portions or the edge portions of the window blind may be worn. Additionally, an operational reliability of the window blind may deteriorate.

A need thus exists for a roller shade apparatus, which is not susceptible to the drawback mentioned above.

SUMMARY

According to an aspect of this disclosure, a roller shade apparatus for a vehicle includes a shade sheet placed selectively in wound-up and extended states, the wound-up state being established to uncover a light transmitting member adapted to be mounted to the vehicle when the shade sheet is moved in an opening direction, the extended state being established to shield the light transmitting member when the shade sheet is moved in a closing direction that is in opposition to the opening direction, a pair of guide rails extending in the opening and closing directions of the shade sheet and adapted to be arranged on the vehicle so that guide portions of the guide rails are positioned to face each other, the guide portions being arranged to guide side end portions of the shade sheet, the side end portions being provided at both side ends of the shade sheet in a width direction that is perpendicular to the opening and closing directions of the shade sheet, and a pair of plate-shaped guide belts extending along the opening and closing directions, slidably supported by the pair of guide portions in the opening and closing directions, and connected to the respective side end portions of the shade sheet, wherein each of the guide belts is curved in the width direction, the guide belt including one surface formed into a curved shape having a convex surface, and a central portion of the convex surface in cross section in the width direction is connected to each of the side end portions, and wherein each of the guide portions includes a pair of lock portions locking side portions of the guide belt, respectively, in a condition where the convex surface of the guide belt faces a surface of the shade sheet.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view of a roof of a vehicle on which an electric roller shade apparatus according to a first embodiment disclosed here is arranged;

DETAILED DESCRIPTION

A roller shade apparatus for a vehicle, according to first and second embodiments will be explained with reference to illustrations of drawings as follows. A vertical direction (upper and lower sides), a longitudinal direction (front and rear sides), a lateral (width) direction (right and left sides), and interior and exterior sides described hereinafter are based on directions in a vehicle 1 unless otherwise specified.

First Embodiment

Configuration of an Electric Roller Shade Apparatus

Figure 2:
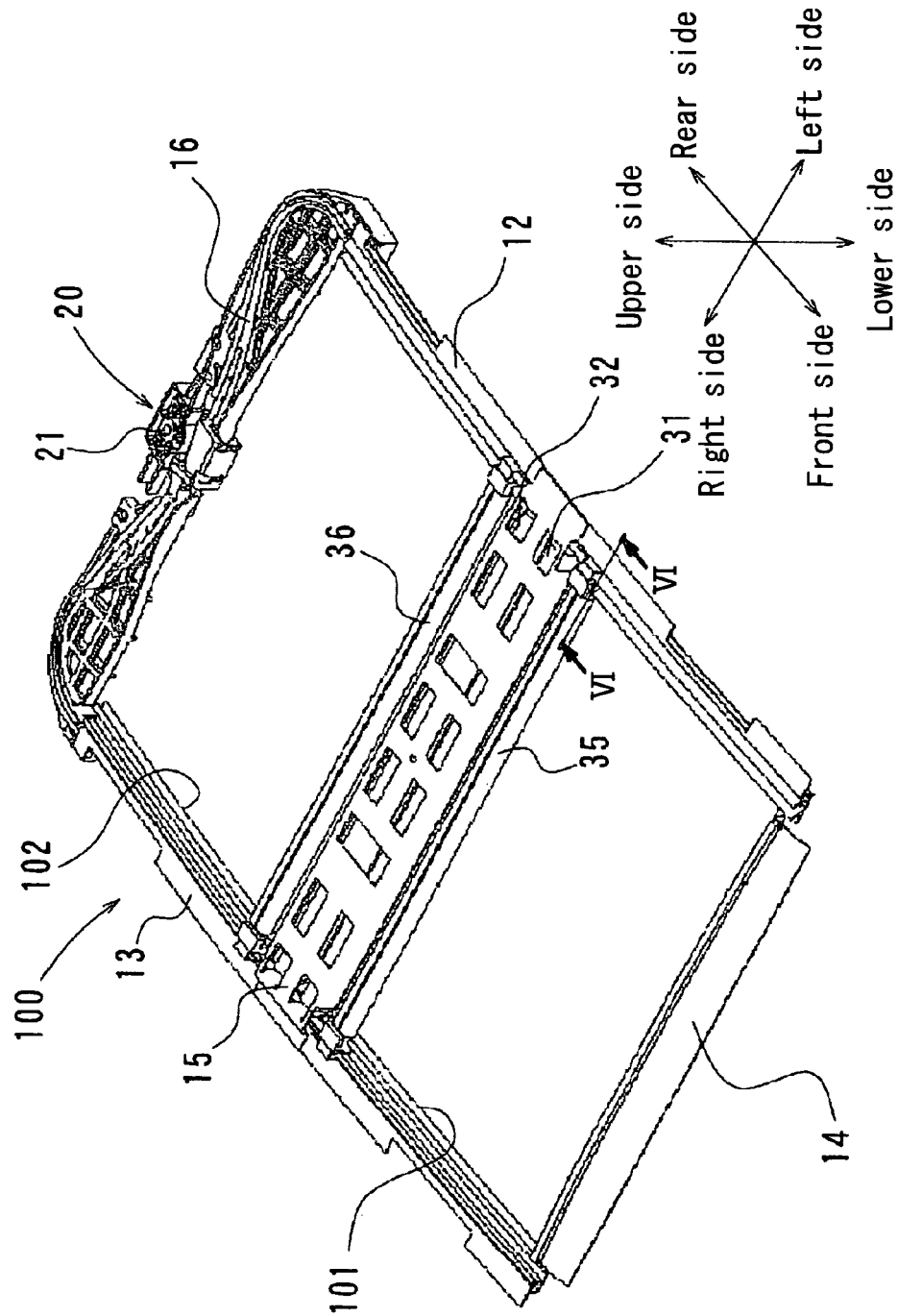
FIG. 2 is a perspective view of the electric roller shade apparatus according to the first embodiment disclosed here.

FIG. 1 shows a schematic view of a roof 10 of the vehicle 1. As illustrated in FIG. 1, an approximately square-shaped roof opening portion 10a is formed in the roof 10 and a resin or glass roof panel 11 (light transmitting member) configuring a transparent area in the roof opening portion 10a is arranged on the roof 10. As illustrated in FIG. 2, an electric roller shade apparatus 100 (roller shade apparatus for a vehicle) is arranged at a lower side of the roof panel 11 on the roof 10.

FIG. 2 is a perspective view of the electric roller shade apparatus 100. As shown in FIG. 2, a pair of guide rails 12 and 13 is arranged on the roof 10. The guide rails 12 and 13 extending along a longitudinal direction (opening and closing directions of shade sheets 33 and 34 that will be described below) of the vehicle 1 face each other at side edges in a lateral direction (perpendicular to the opening and closing directions) of the vehicle 1. Further, a front frame 14, a center frame 15, and a resin housing 16 each extending along the lateral direction are arranged on the roof 10. The front frame 14 cross-connects respective front ends of the guide rails 12 and 13. The center frame 15 cross-connects respective intermediate portions of the guide rails 12 and 13. The resin housing 16 cross-connects respective rear ends of the guide rails 12 and 13.

Furthermore, an actuator 20 is attached to a center portion of the resin housing 16 in a longitudinal direction of the resin housing 16. The actuator 20 includes an electric motor and a driving gear 21. The driving gear 21 is connected to a rotary shaft of the electric motor so as to be driven thereby. A pair of rack belts 22 and 23 (see FIG. 3) is engaged with the driving gear 21. One end of each of the rack belts 22 and 23 is wound up along with a rotation of the driving gear 21 while the other end of each of the rack belts 22 and 23 is wound out along with the rotation of the driving gear 21. The pair of rack belts 22 and 23 extends from the driving gear 21 along the resin housing 16 toward the guide rails 12 and 13 while being individually guided by the guide rails 12 and 13.

Side ends of a winding roller 31 are supported at front ends of the center frame 15 and side ends of a winding roller 32 are supported at rear ends of the center frame 15. Each of the winding rollers 31 and 32 has a winding shaft and extends along the lateral direction. The shade sheet 33 (see FIGS. 3 to 5) that is wound up and out by the winding roller 31 is wound thereon. In particular, the shade sheet 33 is placed selectively in wound-up and extended states. The wound-up state is established to uncover the roof panel 11 adapted to be mounted to the vehicle 1 when the shade sheet 33 is moved in the opening direction. The extended state is established to shield the roof panel 11 when the shade sheet 33 is moved in the closing direction that is in opposition to the opening direction. The shade sheet 33 is constantly biased by a biasing means, which is contained in the winding roller 31, in a winding-up direction. That is, distal ends of side end portions 33a (described below) of the shade sheet 33 in a width direction in the vicinity of the winding roller 31, serving as fixed ends are connected to the winding roller 31.

A relation between the shade sheet 34 and the winding roller 32 is the same as a relation between the shade sheet 33 and the winding roller 31; therefore, an explanation of the relation between the shade sheet 34 and the winding roller 32 is omitted. In addition, the shade sheet 33 and the shade sheet 34 are not limited to a sheet that completely shields light and a sheet having a modified transmittancy may be applicable.

Figure 3:
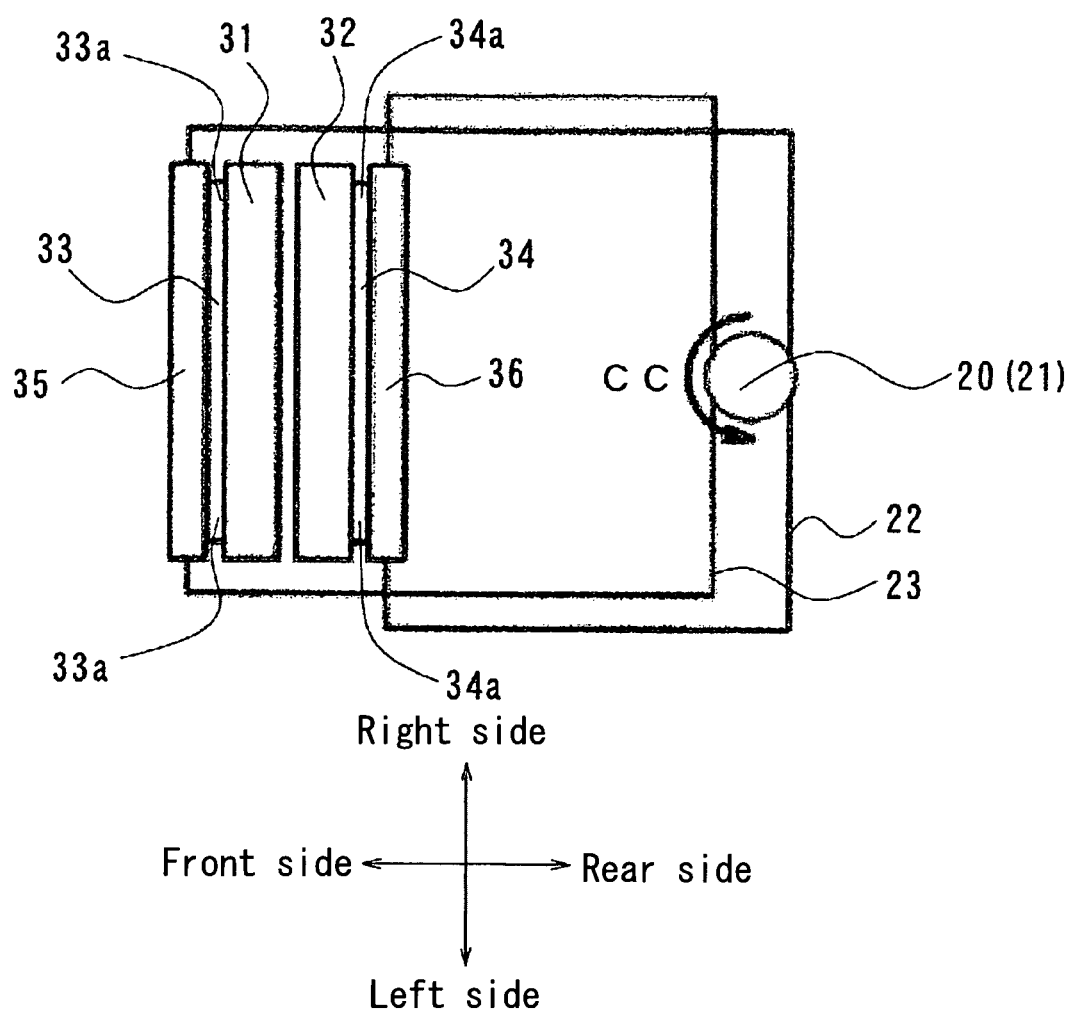
FIG. 3 is a schematic configuration diagram of a rack belt driving a garnish of the electric roller shade apparatus according to the first embodiment disclosed here.
Figure 6:
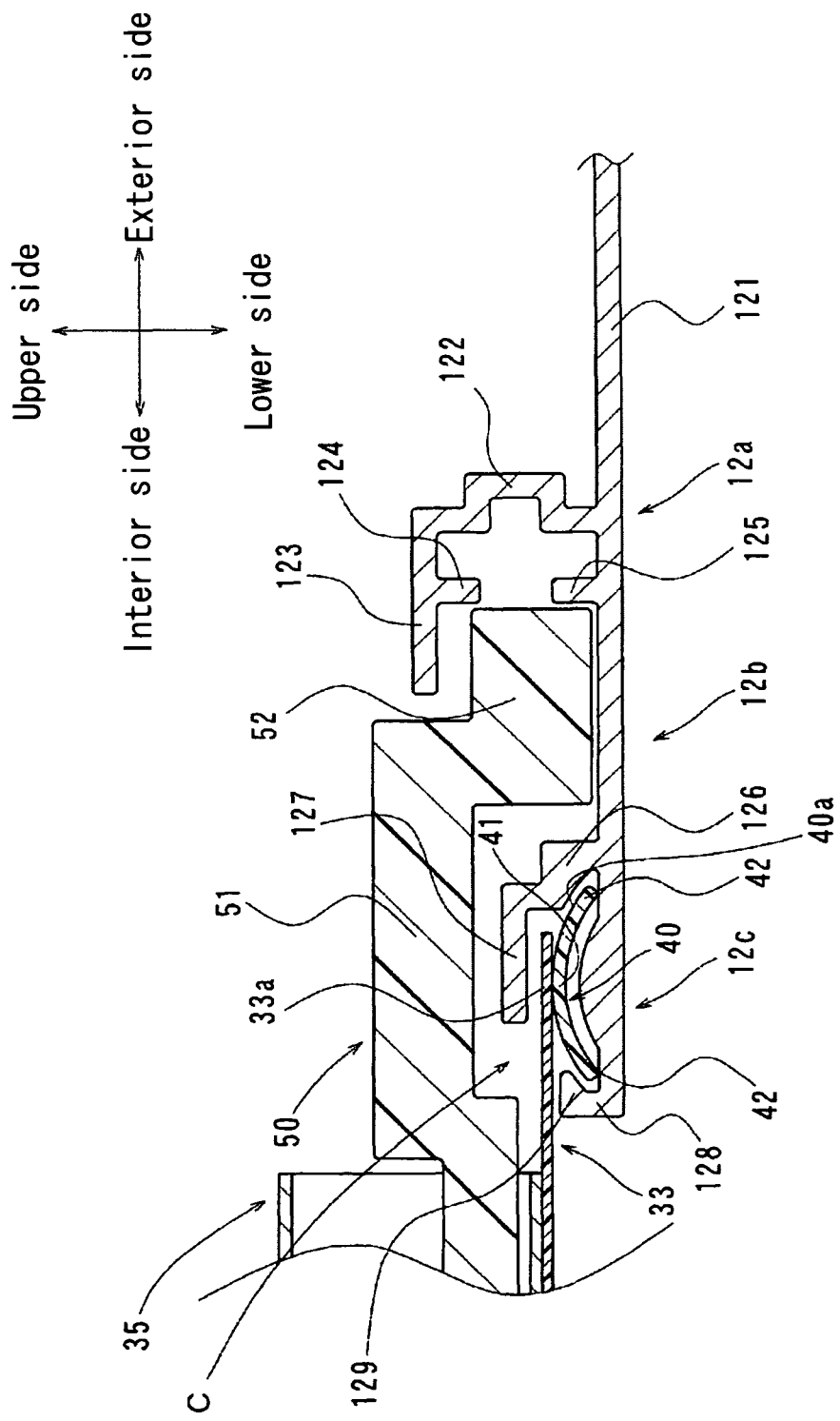
FIG. 6 is a cross-sectional view taken along the line VI-VI of FIG. 2.

A pair of flexible belts 40 (guide belts) having an approximately plate shape is attached to the respective side end portions 33a of the shade sheet 33 so as to extend in the longitudinal direction of the vehicle 1 and the pair of flexible belts 40 is attached to side end portions 34a of the shade sheet 34 so as to extend in the longitudinal direction (see FIG. 3 and FIG. 6). Each of the flexible belts 40 is formed into a strip by means of a flexible material (for example, a resin material). The flexible belts 40 extend along the longitudinal direction of the vehicle 1 while being guided by the guide rails 12 and 13, respectively. The flexible belts 40 are wound up by the winding rollers 31 and 32 in the same way as the shade sheets 33 and 34 are wound up by the winding rollers 31 and 32.

Distal ends of the side end portions 33a in the width direction, to which the winding roller 31 is not connected, serve as free ends. A garnish 35 is attached to the distal ends of the side end portions 33a. Similarly, distal ends of the side end portions 34a in a width direction, to which the winding roller 32 is not connected, serve as free ends. A garnish 36 is attached to the distal ends of the side end portions 34a. Each of the distal ends of the side end portions 33a and the side end portions 34a is positioned at the further slightly exterior side in the width direction (lateral direction of the vehicle 1). Each of the garnishes 35 and 36 has approximately the same length as the width of the winding roller 31 and 32 so as to extend in parallel thereto in the lateral direction of the vehicle 1 (width direction of the shade sheets 33 and 34) (see FIGS. 2 to 4).

A pair of runners 50 (see FIG. 6) is attached to side ends of the garnish 35 in the lateral direction so as to be arranged oppositely in the lateral direction of the vehicle 1 to be guided respectively by the guide rails 12 and 13. Similarly, the pair of runners 50 is attached to side ends of the garnish 36 in the lateral direction so as to be arranged oppositely in the lateral direction of the vehicle 1 to be guided respectively by the guide rails 12 and 13. The rack belts 22 and 23 are connected to the runners 50. The garnishes 35 and 36 are simultaneously moved in the longitudinal direction of the vehicle 1 in accordance with a movement of the rack belts 22 and 23 while being kept in parallel to the winding rollers 31 and 32.

FIG. 3 is a schematic configuration diagram of the rack belts 22 and 23 driving the garnishes 35 and 36. As shown in FIG. 3, the rack belt 22 is engaged with the driving gear 21 at the rear side in the longitudinal direction of the vehicle 1. One and the other ends of the rack belt 22 are fixed respectively to one of the side ends of the garnish 35 (runner 50) and one of the side ends of the garnish 36 (runner 50). Meanwhile, the rack belt 23 is engaged with the driving gear 21 at the front side in the longitudinal direction. One and the other ends of the rack belt 23 are fixed respectively to the other of the side ends of the garnish 35 (runner 50) and the other of the side ends of the garnish 36 (runner 50). Thus, the rack belts 22 and 23 are driven by the actuator 20 so as to slide in the opposite direction from each other. When the driving gear 21 rotates in a counterclockwise direction CC as shown in FIG. 3, an engagement portion between the rack belt 22 and the driven gear 21 shifts toward a right side of the vehicle 1 and an engagement portion between the rack belt 23 and the driving gear 21 shifts toward a left side of the vehicle 1. Accordingly, the garnish 35 and the shade sheet 33 are moved toward a front side of the vehicle 1 (in a closing direction) at the same time as the garnish 36 and the shade sheet 34 are moved toward a rear side of the vehicle 1 (in a closing direction). Meanwhile, when the driving gear 21 rotates in an opposite direction (in a clockwise direction shown in FIG. 3) to the counterclockwise direction CC, the garnish 35 is moved toward the rear side of the vehicle 1 (in an opening direction) and the garnish 36 is moved toward the front side of the vehicle 1 (in an opening direction).

Figure 4:
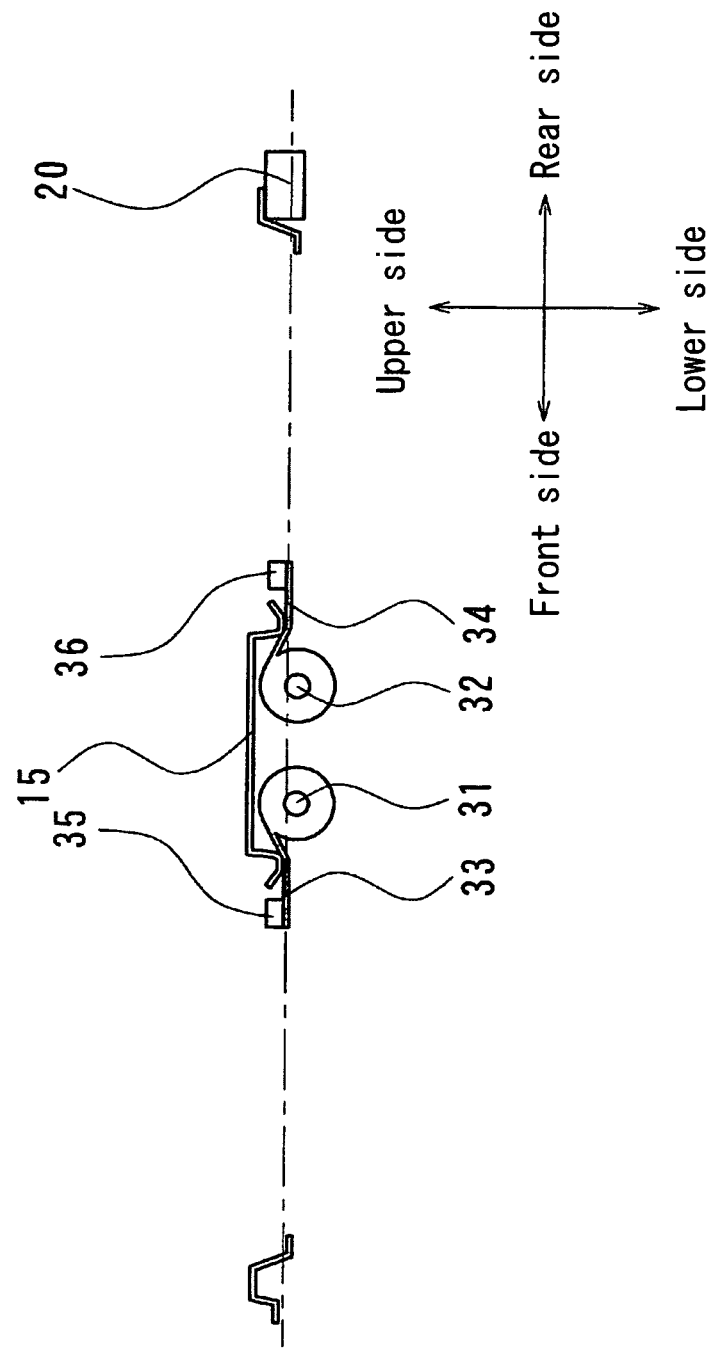
FIG. 4 is a schematic cross-sectional view of the electric roller shade apparatus according to the first embodiment disclosed here (in a wound-up state)
Figure 5:
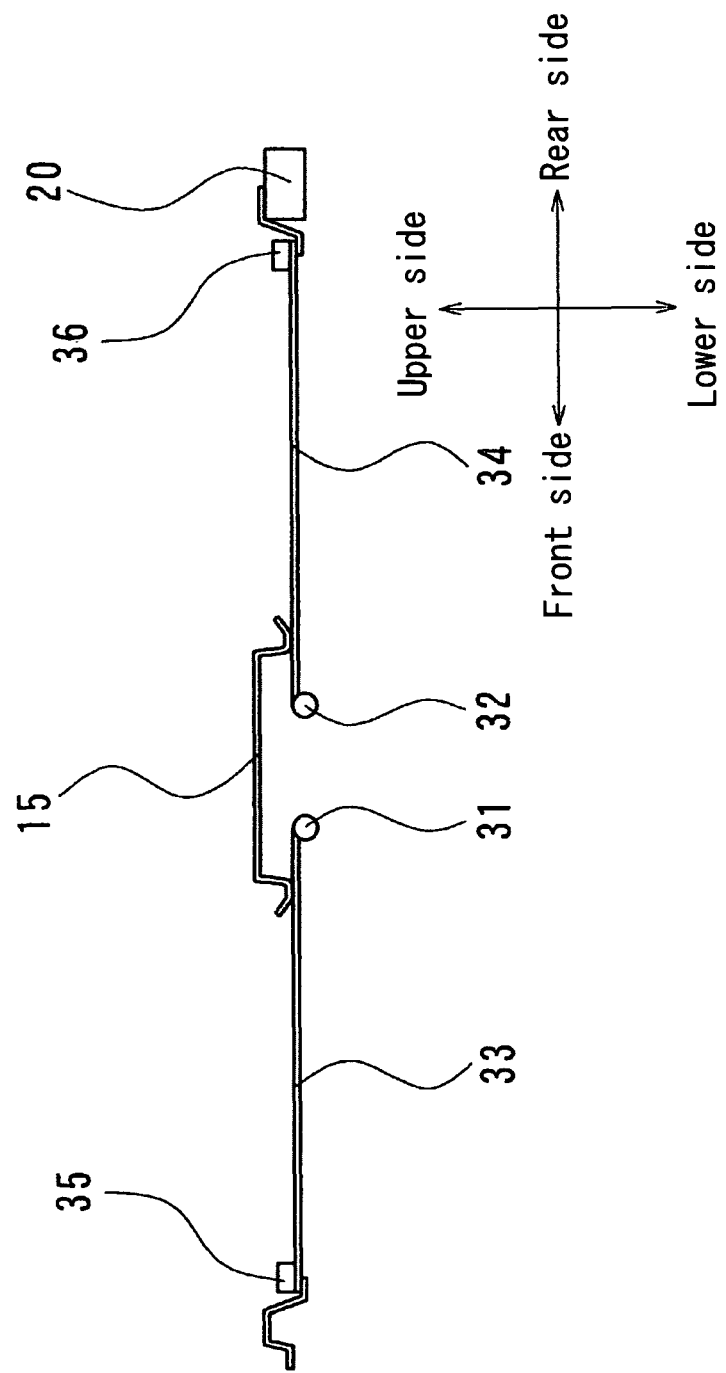
FIG. 5 is a schematic cross-sectional view of the electric roller shade apparatus according to the first embodiment disclosed here (in an extended state)

FIG. 4 and FIG. 5 illustrate schematic cross-sectional views of the electric roller shade apparatus 100.

In particular, the shade sheets 33 and 34 in the wound-up state are shown in FIG. 4. As illustrated in FIG. 4, the shade sheets 33 and 34 are wound up by the winding rollers 31 and 32 into the wound-up state to thereby open a front opening portion 101 (see FIG. 2) defined by the guide rails 12 and 13, the front frame 14, and the center frame 15 and to open a rear opening portion 102 (see FIG. 2) defined by the guide rails 12 and 13, the center frame 15, and the resin housing 16; therefore plenty of light is brought into an interior space of the vehicle 1.

In particular, the shade sheets 33 and 34 in the extended state are shown in FIG. 5. As illustrated in FIG. 5, the shade sheets 33 and 34 are wound out by the winding rollers 31 and 32 into the extended state to thereby close the front and rear opening portions 101 and 102. When the garnishes 35 and 36 are stopped at respective predetermined positions, the amount of light is appropriately adjusted.

<Detailed Configuration of the Electric Roller Shade Apparatus>

FIG. 6 is a view taken along the line VI-VI of FIG. 2, i.e. a cross-sectional view of the garnish 35, the shade sheet 33, the guide rail 12, and the like is illustrated in FIG. 6. Here, a cross-sectional view of the garnish 36, the shade sheet 34, the guide rail 13, and the like is approximately similar to the view shown in FIG. 6. In addition, the guide rail 13 has a symmetric configuration relative to a configuration of the guide rail 12; therefore, a detailed explanation of a cross-sectional view of the guide rail 13 is omitted.

The guide rail 12 is configured by an extruded member, for example, of aluminum. As illustrated in FIG. 6, the guide rail 12 is positioned at an exterior side of the vehicle 1 while having a rack guide portion 12a having an opening that faces an interior side of the vehicle 1. The rack guide portion 12a extends along the longitudinal direction of the vehicle 1. The rack guide portion 12a therein accommodates the rack belt 23 to slidably move. The guide rail 12 also includes a runner guide portion 12b and a belt guide portion 12c (guide portion). The runner guide portion 12b is positioned at the further interior side than the rack guide portion 12a. The runner guide portion 12b extends along the longitudinal direction and guides the runner 50 to slidably move. The belt guide portion 12c is arranged at the further interior side than the runner guide portion 12b. The belt guide portion 12c extends along the longitudinal direction and therein accommodates the flexible belt 40 to slidably move.

As described above, the guide rails 12 and 13 extend in the opening and closing directions of the shade sheet 33 while being arranged at the vehicle 1 so that the belt guide portions 12c arranged to guide the side end portions 33a of the shade sheet 33 (flexible belts 40) in the opening and closing directions may face each other. The side end portions 33a of the shade sheet 33 are positioned in the lateral direction, perpendicular to the opening and closing directions.

<Detailed Configuration of the Guide Rail>

As shown in FIG. 6, the guide rail 12 includes a bottom wall portion 121, a first vertical wall portion 122, a first upper wall portion 123, a first tongue-shaped portion 124, and a second tongue-shaped portion 125. The bottom wall portion 121 extends along the longitudinal direction of the vehicle 1. The first vertical wall portion 122 extends from the bottom wall portion 121 toward an upper side of the vehicle 1. The first upper wall portion 123 extends from an upper end of the first vertical wall portion 122 toward the interior side. The first tongue-shaped portion 124 protrudes from an intermediate portion of the first upper wall portion 123 toward a lower side of the vehicle 1. The second tongue-shaped portion 125 protrudes from the bottom wall portion 121 towards the upper side so as to vertically face the first tongue-shaped portion 124.

The aforementioned rack guide portion 12a is configured by the bottom wall portion 121, the first vertical wall portion 122, the first upper wall portion 123, the first tongue-shaped portion 124, and the second tongue-shaped portion 125.

The guide rail 12 further includes a second vertical wall portion 126 (outer wall portion), a second upper wall portion 127 (covered wall portion), a third vertical wall portion 128, and a third upper wall portion 129 (lock portion). The second vertical wall portion 126 extends from the bottom wall portion 121 toward the upper side at the further interior side than an inner end of the first upper wall portion 123. The second upper wall portion 127 extends from an upper end of the second vertical wall portion 126 toward the interior side. The third vertical wall portion 128 extends from the bottom wall portion 121 toward the upper side at the further interior side than an inner end of the second upper wall portion 127. The third upper wall portion 129 extends from an upper end of the third vertical wall portion 128 toward the exterior side.

The belt guide portion 12c is configured by the bottom wall portion 121, the second vertical wall portion 126, the second upper wall portion 127, the third vertical wall portion 128, and the third upper wall portion 129. That is, the belt guide portion 12c is formed by the bottom wall portion 121, the third vertical wall portion 128 vertically arranged from the bottom wall portion 121, the second vertical wall portion 126 arranged at the further exterior side than the third vertical wall portion 128 and vertically in the same way as the third vertical wall portion 128, and the second upper wall portion 127 extending from the upper end of the second vertical wall portion 126 toward the interior side. Further, an accommodating space C surrounded by the bottom wall portion 121, the second vertical wall portion 126, the second upper wall portion 127, the third vertical wall portion 128, and the third upper wall portion 129 is formed in the belt guide portion 12c.

In addition, the aforementioned runner guide portion 12b is configured by the bottom wall portion 121, the first upper wall portion 123, the first tongue-shaped portion 124, the second tongue-shaped portion 125, and the second vertical wall portion 126.

Here, the runner 50 includes a base portion 51 extending in the lateral direction and connected to the garnish 35 and a bent portion 52 bent from an outer end of the base portion 51 toward the lower side and extending from a lower end of the base portion 51 toward the exterior side. The bent portion 52 is guided by the runner guide portion 12b; thereby the garnish 35 is movably supported by the guide rail 12. Further, the belt guide portion 12c is located at a lower side of the base portion 51.

<Detailed Configuration of the Belt Guide Portion>

Figure 7:
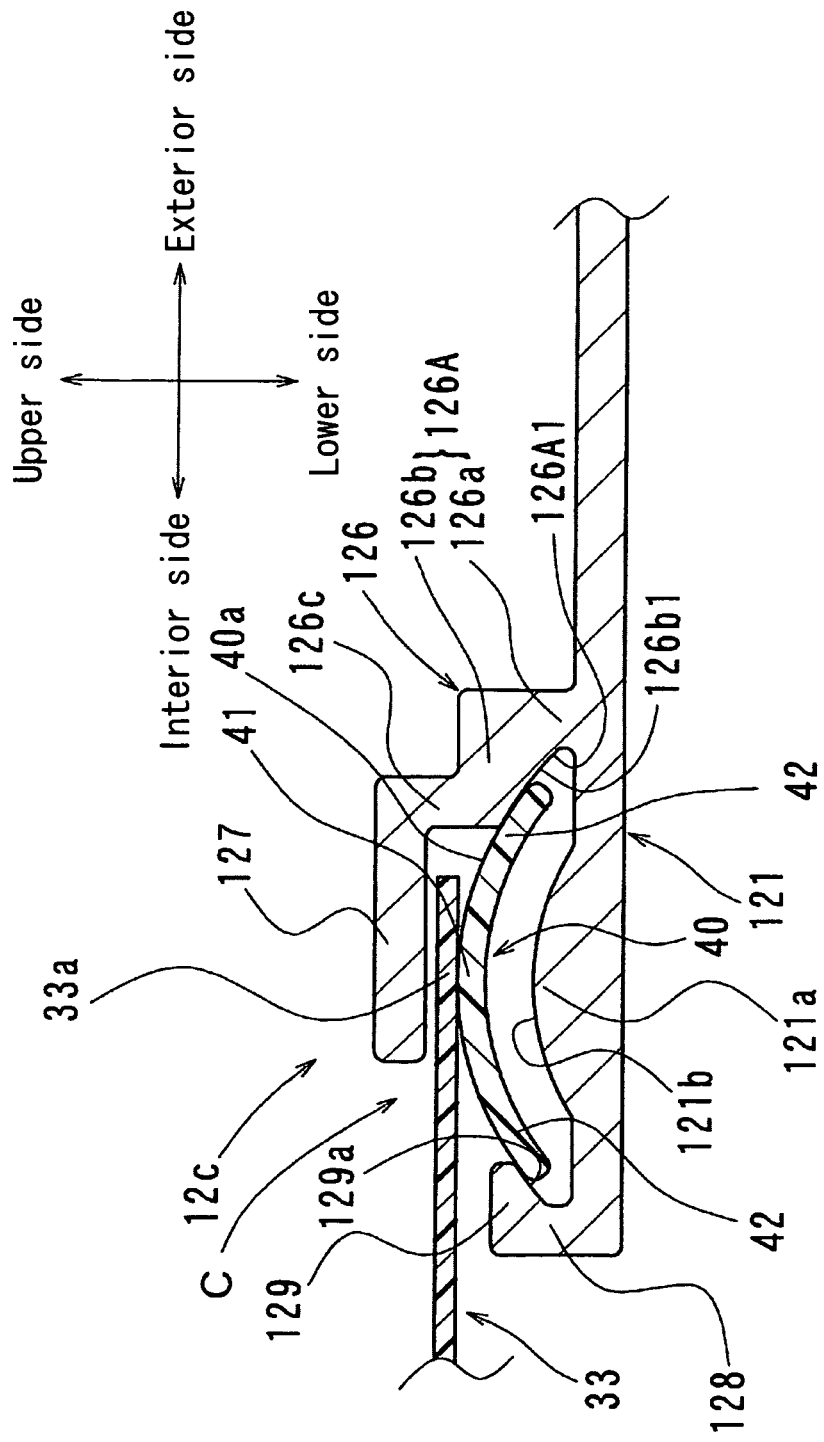
FIG. 7 is an enlarged view of a belt guide portion of the electric roller shade apparatus according to the first embodiment disclosed here.
Figure 8:
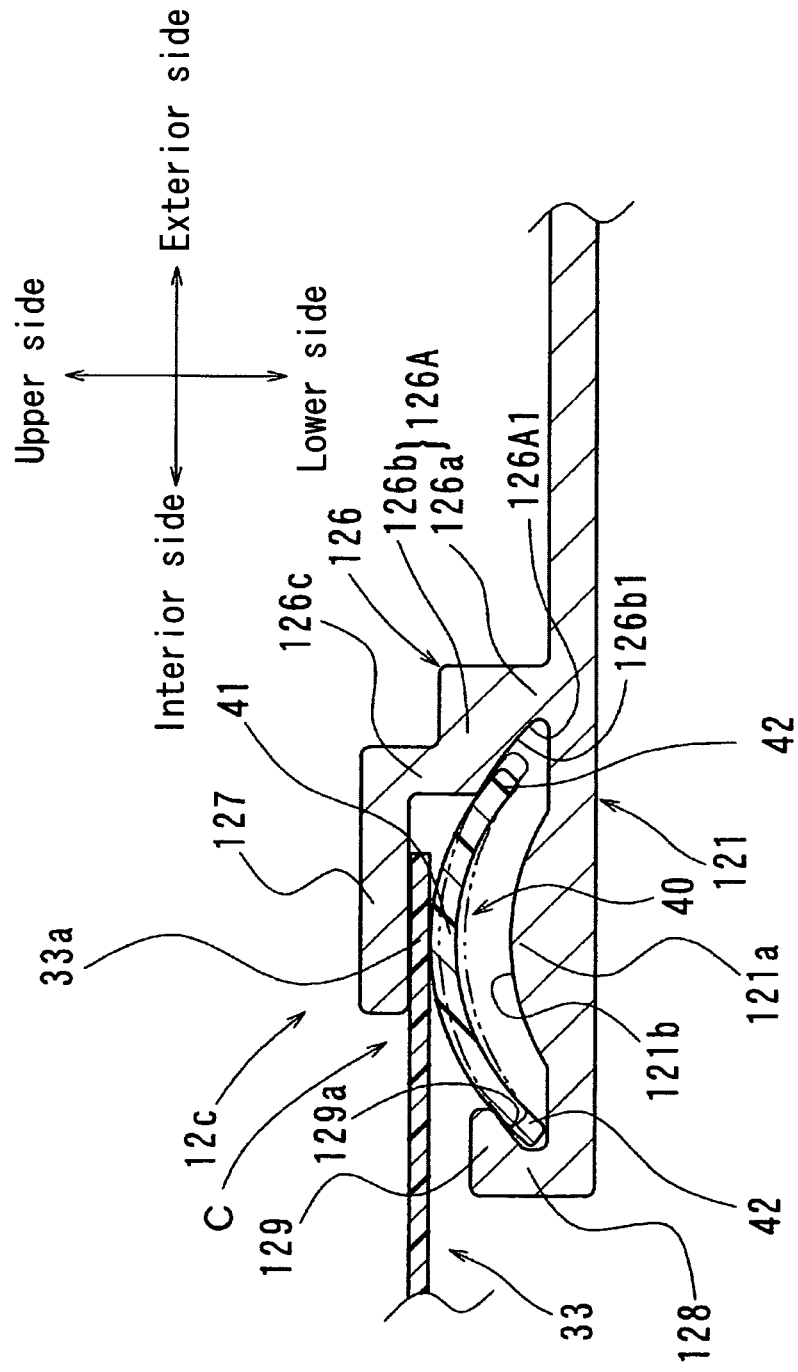
FIG. 8 is an enlarged view of the belt guide portion of the electric roller shade apparatus according to the first embodiment disclosed here.

FIG. 7 and FIG. 8 show an enlarged view of the belt guide portion 12c. FIG. 7 illustrates an example where a predetermined tensile force is applied to the shade sheet 33. FIG. 8 illustrates an example where a tensile force larger than the predetermined tensile force is applied to the shade sheet 33. As shown in FIG. 7 and FIG. 8, a curved surface portion 129a having a predetermined curvature is formed on the third upper wall portion 129. Further, the second vertical wall portion 126 includes a vertical wall portion 126a, an extending portion 126b (lock portion), and a vertical wall portion 126c. The vertical wall portion 126a extends toward the upper side of the vehicle 1 while connecting to the bottom wall portion 121. The extending portion 126b extends from the vertical wall portion 126a toward the interior side in a manner to be positioned close to the upper wall portion 129. The vertical wall portion 126c extends from an inner end of the extending portion 126b toward the upper side while connecting to the second upper wall portion 127. Here, the vertical wall portion 126c may be positioned, for example, at the exterior side.

The extending portion 126b includes a curved surface portion 126b1 having the same curvature as the curved surface portion 129a. Here, the vertical wall portion 126a and the extending portion 126b configure a base portion 126A and the base portion 126A includes a recessed portion 126A1 recessed toward the exterior side.

As illustrated in FIG. 6 and FIG. 7, when an external force is not applied to the flexible belt 40, an outer peripheral surface 40a (convex surface) of the flexible belt 40, which is one surface of the flexible belt 40, has a curved shape curved toward a direction perpendicular to a surface of the shade sheet 33. The flexible belt 40 has a circular arc shape in a width-directional cross section. The width-directional cross section in the first embodiment is a cross section of a surface cut along a direction perpendicular to the opening and closing directions of the shade sheet 33. The circular arc shape in such cross section is set to have the approximately same curvature as the curved surface portions 129a and 129b1.

Accordingly, a portion of the flexible belt 40 is formed into the cross-sectional circular arc shape within the belt guide portion 12c when the shade sheet 33 is wound out from the winding roller 31. Meanwhile, a portion of the flexible belt 40 is deformed by a biasing force of the winding roller 31 into an approximately flattened shape relative to the shade sheet 33 when the shade sheet 33 is wound up by the winding roller 31, thereby being brought into the wound-up state along with the shade sheet 33. The flattened shape in the width-directional cross section in the first embodiment is a rectangular shape parallel to the shade sheet 33 in the extended state in the width-directional cross section. That is, when the shade sheet 33 is in the extended state, the flexible belt 40 is accommodated in the belt guide portion 12c while being formed into the cross-sectional circular arc shape. Meanwhile, when the shade sheet 33 is in the wound-up state, the flexible belt 40 is formed into the cross-sectional rectangular shape and wound up along with the shade sheet 33 by the winding roller 31. Then, the side end portion 33a of the shade sheet 33 is connected to a central portion 41 of the flexible belt 40. In particular, the central portion 41 on the convex surface 40a is connected to the side end portion 33a of the shade sheet 33. In particular, the flexible belt 40 is configured so that the central portion 41 and the outer peripheral surface 40a having the cross-sectional circular arc shape are sewed to the shade sheet 33. Additionally, the side end portion 33a of the shade sheet 33 is positioned at the further exterior side than the third vertical wall portion 128 in the lateral direction of the vehicle 1 and arranged between the second upper wall portion 127 and the third upper wall portion 129 in a vertical direction of the vehicle 1. Here, the central portion 41 corresponds to a portion located in the vicinity of the center of the flexible belt 40 in the lateral direction, but is it not necessary for the central portion 41 to be positioned in the center of the flexible belt 40 in the lateral direction. For example, when the central portion 41 is closer to the interior side than the center of the flexible belt 40, a surface area of the shade sheet 33 may be reduced.

Side portions 42 of the flexible belt 40 in the lateral direction are desirably designed so as to slide in contact with the bottom wall portion 121. However, as illustrated in FIG. 7, for example, as long as a predetermined tensile force is applied to the shade sheet 33 when the shade sheet 33 is attached to the guide rail 12, the side portions 42 on the outer peripheral surface 40a make planar contact with the curved surface portions 129a and 126b1, respectively, while the flexible belt 40 is not deformed to remain in the cross-sectional circular arc shape. Accordingly, the flexible belt 40 is prevented from further moving upwardly in the vertical direction. At this time, the side end portion 33a of the shade sheet 33 is designed so as not to contact the second upper wall portion 127. That is, the third upper wall portion 129 and the extending portion 126b serve as a pair of lock portions locking the side portions 42 of the flexible belt 40, respectively, while the convex surface 40a of the flexible belt 40 faces the surface of the shade sheet 33.

Moreover, as illustrated in FIG. 8, when a tensile force larger than the predetermined tensile force is applied to the shade sheet 33 to deform the flexible belt 40 from the cross-sectional circular arc shape in such a way that the side portions 42 are positioned close to each other, the central portion 41 of the flexible belt 40 makes contact with the second upper wall portion 127 via the shade sheet 33. Accordingly, the flexible belt 40 is prevented from being detached from the belt guide portion 12c (accommodating space C). Here, the flexible belt 40 shown in FIG. 7 is illustrated by chain double-dashed lines shown in FIG. 8.

In addition, a convex portion 121a is provided in an intermediate portion between the second vertical wall portion 126 and the third vertical wall portion 128 so as to protrude upwardly therefrom. The convex portion 121a projecting toward the flexible belt 40 and along the curved shape of the flexible belt 40 includes a guide surface 121b having a predetermined curvature. The guide surface 121b allows the flexible belt 40 to be easily deformed from the cross-sectional rectangular shape to the cross-sectional circular arc shape.

<Detailed Configuration of the Winding Roller>

Figure 9:
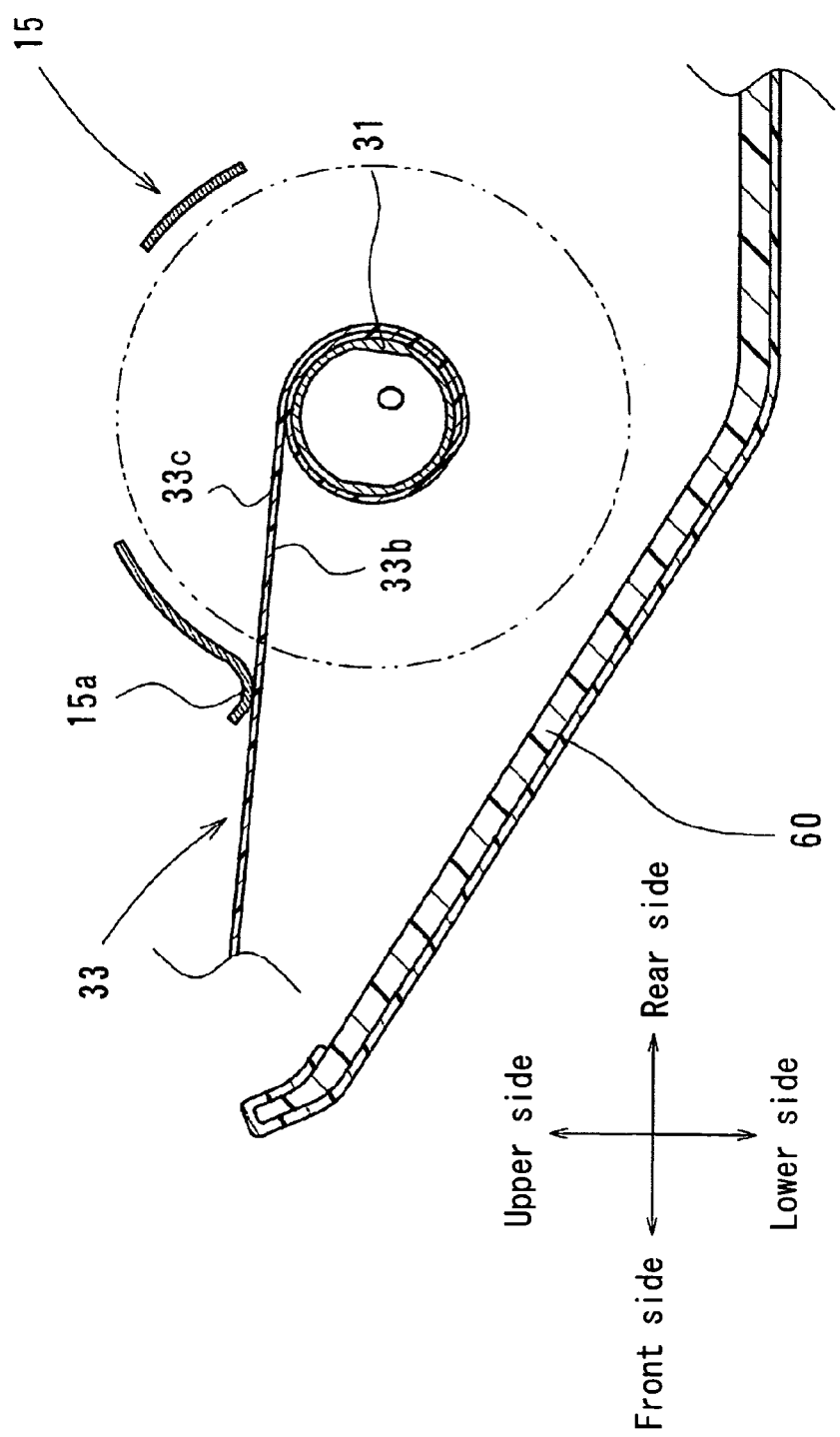
FIG. 9 is a cross-sectional view of a winding roller of the electric roller shade apparatus according to the first embodiment disclosed here.

FIG. 9 illustrates a cross-sectional view of the winding roller 31. A rotation center O of the winding roller 31 is located at a lower side of an extended surface of the shade sheet 33 in the vertical direction. Accordingly, the shade sheet 33 is wound up by the winding roller 31 in a clockwise direction seen in FIG. 9.

Consequently, when the shade sheet 33 is wound up by the winding roller 31, an upper surface 33c of the shade sheet 33 is slightly stretched in the longitudinal direction. As a result, a lower surface 33b of the shade sheet 33 is slightly shrunk in the longitudinal direction. Therefore, the upper surface 33c is lightly shrunk in the lateral direction and the lower surface 33b is slightly stretched in the lateral direction. Further, the flexible belt 40 having the cross-sectional circular arc shape is attached to the lower surface 33b of the shade sheet 33; therefore, when the shade sheet 33 is wound up by the winding roller 31, the flexible belt 40 is easily deformed from the cross-sectional circular arc shape to the cross-sectional rectangular shape.

Moreover, the winding roller 31 is covered by an inner trim 60 attached to the roof 10 so as not to be seen from the interior side of the vehicle 1. In addition, the center frame 15 includes a guide portion 15a guiding the shade sheet 33 and being in contact therewith when the shade sheet 33 is wound up by the winding roller 31.

According to the aforementioned first embodiment, the electric roller shade apparatus 100 is applied as the shade apparatus for the roof panel 11 of the vehicle 1. In addition, the electric roller shade apparatus 100 may be applicable to a shade apparatus for a front glass, a rear glass, a side glass, and the like.

According to the first embodiment, the electric roller shade apparatus 100 is operated by a driving force of the actuator 20. Alternatively, the electric roller shade apparatus 100 may be modified to a manual roller shade apparatus operated manually by means of an operating force of an occupant of a vehicle.

According to the aforementioned first embodiment, the flexible belt 40 has the cross-sectional circular arc shape in the width direction of the flexible belt 40. Alternatively, the flexible belt 40 may be formed into a partially circular arc shape, an oval shape, or the like as long as the flexible belt 40 is curved in the width direction of the flexible belt 40 while having one curved surface that is a convex surface.

According to the aforementioned first embodiment, the convex portion 121a is arranged at the bottom wall portion 121, but it is not necessarily arranged thereat. Further, the convex portion 121a includes the guide surface 121b having the predetermined curvature. Alternatively, the guide surface 121b is not limited to a circular arc shape and may be formed into a rectangular shape having chamfered corners and the like as long as the guide surface 121b is formed into a shape for guiding the flexible belt 40.

According to the aforementioned first embodiment, the cross-sectional circular arc shape of the flexible belt 40 is set to have the approximately same curvature as the curved surface portions 129a and 126b1, but it does not necessarily have the same curvature. Alternatively, the curved surface portions 129a and 126b1 may be modified from a circular arc shape to a curved-line shape so as to approximately make planar contact with the flexible belt 40. Additionally, it is not necessary to provide the curved surface portions 129a and 126b1.

According to the aforementioned first embodiment, the belt guide portion 12c includes the second upper wall portion 127, but it may not necessarily include the second upper wall portion 127. For example, the belt guide portion 12c may be configured by the bottom wall portion 121, the second vertical wall portion 126, the third vertical wall portion 128, and the third upper wall portion 129 and the second vertical wall portion 126 includes the vertical wall portion 126a and the extending portion 126b.

The flattened shape of the flexible belt 40 in the aforementioned first embodiment is formed into the rectangular shape in parallel to the shade sheet 33 in the extended state in the width-directional cross section. Alternatively, the flattened shape is not limited to the rectangular shape and may be of a different shape as long as the shape is slightly flattened from the curved shape.

According to the aforementioned first embodiment, when an external force is not applied to the flexible belt 40, the flexible belt 40 has the curved shape. In addition, when the external force is not applied to the flexible belt 40, the flexible belt may have the flattened shape. In such case, the belt guide portion 12 applies an external force to the flexible belt 40 to thereby deform the flexible belt 40 into the curved shape.

According to the aforementioned first embodiment, the belt guide portion 12c is formed by the bottom wall portion 121, the third vertical wall portion 128 vertically formed from the bottom wall portion 121, the second vertical wall portion 126 arranged at the further exterior side than the third vertical wall portion 128 and extending vertically in the same direction as the third vertical wall portion 128, and the second upper wall portion 127 extending from the upper end of the second vertical wall portion 126 toward the interior side. Alternatively, the belt guide portion 12c may be modified as in a second embodiment explained below. In the second embodiment, the position of the third vertical wall portion 128 may be modified to the second upper wall portion 127 instead of the bottom wall portion 121 as in the first embodiment.

Figure 10:
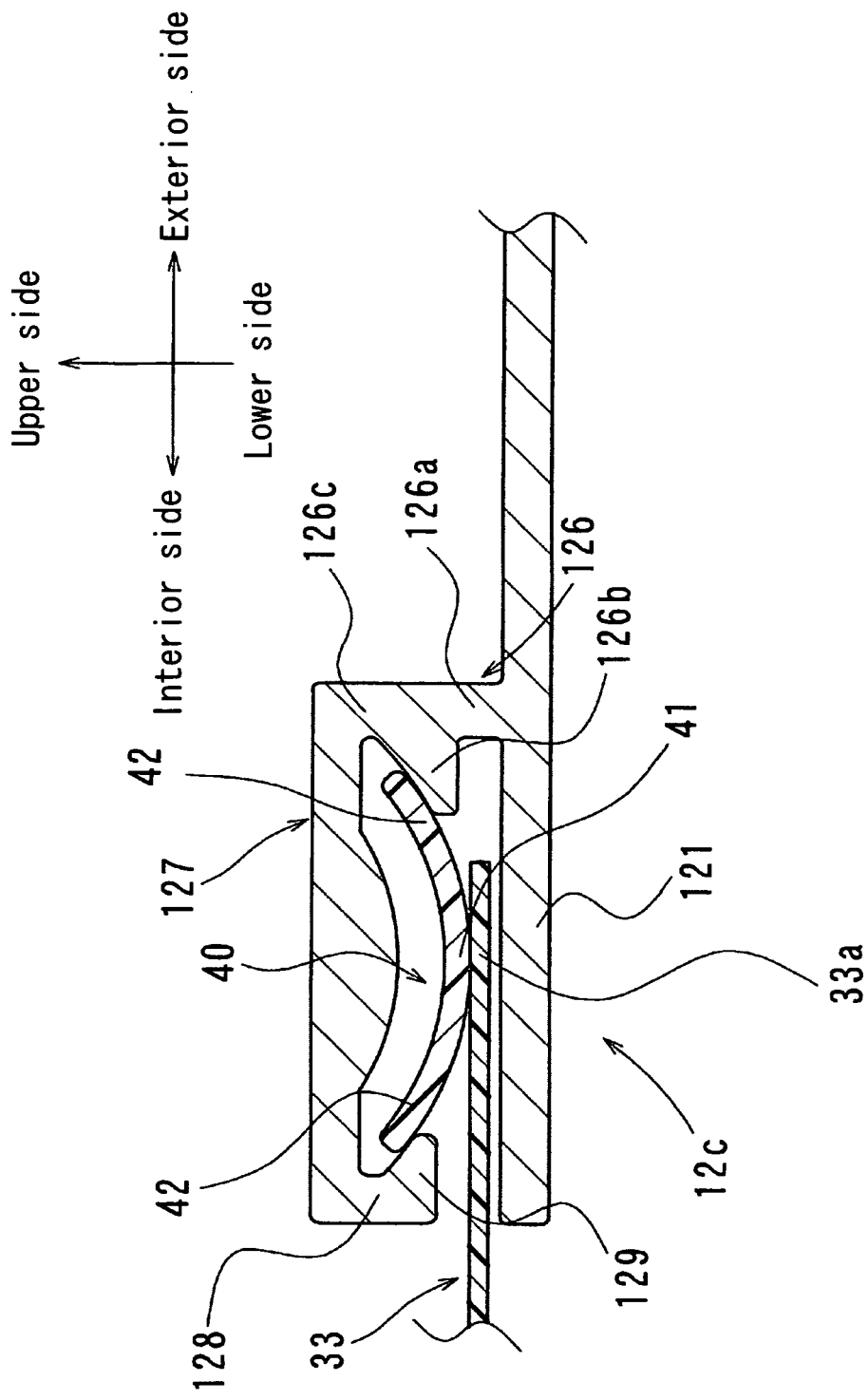
FIG. 10 is an enlarged view of the belt guide portion of the electric roller shade apparatus according to a second embodiment disclosed here.

FIG. 10 shows an enlarged view of the belt guide portion 12c according to the second embodiment. As illustrated in FIG. 10, the belt guide portion 12c of the second embodiment is configured by the bottom wall portion 121, the second vertical wall portion 126 vertically formed from the bottom wall portion 121, the second upper wall portion 127 extending from the upper end of the second vertical wall portion 126 toward the interior side, the third vertical wall portion 128 extending from an inner end of the second upper wall portion 127 toward the bottom wall portion 121, and the third upper wall portion 129 (lock portion) extending from a lower end of the third vertical wall portion 128 toward the external side. The second vertical wall portion 126 includes the vertical wall portion 126a, the extending portion 126b (lock portion), and the vertical wall portion 126c. The vertical wall portion 126a extends toward the upper side in the vertical direction while connecting to the bottom wall portion 121. The extending portion 126b extends from the vertical wall portion 126a toward the interior side in a manner to be positioned close to the third upper wall portion 129. The vertical wall portion 126c extends from an outer end of the extending portion 126b toward the upper side in the vertical direction while connecting to the second upper wall portion 127. The arrangement of the flexible belt 40, the winding roller 31, and the shade sheet 33 relative to the extended surface of the shade sheet 33 is reversed in the vertical direction relative to the arrangement of the first embodiment in accordance with the modified configuration of the belt guide portion 12c of the second embodiment.

As described above, the central portion 41 of the flexible belt 40 is connected to the side end portion 33a of the shade sheet 33 and the side portions 42 of the flexible belt 40 are locked respectively by the third upper wall portion 129 and the extending portion 126b that are the lock portions of the belt guide portion 12c. Accordingly, for example, even when a tensile stress is applied from the shade sheet 33 to the flexible belt 40, the tensile stress is prevented from being unevenly applied to the third upper wall portion 129 and the extending portion 126b. Consequently, an uneven load is prevented from being applied to a slide contact portion between the flexible belt 40 and the belt guide portion 12c. Additionally, the shade sheet 33 is connected to the central portion 41 of the flexible belt 40, therefore preventing the shade sheet 33 from making contact with the third upper wall portion 129 and the extending portion 126b and reducing vibrations of the flexible belt 40 caused by the aforementioned uneven load. Accordingly, the shade sheet 33 is appropriately prevented from making contact with and interfering with the belt guide portion 12c or members neighboring the shade sheet 33.

According to the aforementioned first and second embodiments, the belt guide portion 12c includes the second upper wall portion 127 facing the third upper wall portion 129 and the extending portion 126b via the shade sheet 33 and covering the shade sheet 33 in the vicinity of the shade sheet 33 without contacting therewith.

The side end portion 33a of the shade sheet 33 is covered by the third upper wall portion 129, the extending portion 126b, and the second upper wall portion 127 of the belt guide portion 12c, therefore improving an outer appearance of the shade sheet 33 in comparison with the shade sheet 33 having the side end portions 33a exposed to the outside of the belt guide portion 12c. Further, when an external force is applied to the shade sheet 33 in the direction perpendicular to the opening and closing directions of the shade sheet 33, the side portions 42 of the flexible belt 40 make contact with the third upper wall portion 129 and the extending portion 126b at the same time as the central portion 41 of the flexible portion 40 makes contact with the second upper wall portion 127 via the shade sheet 33, thereby preventing the shade sheet 33 from being detached from the belt guide portion 12c. That is, the shade sheet 33 and the flexible belt 40 are inhibited from being unintentionally loosened from the belt guide portion 12c.

According to the aforementioned first and second embodiments, the electric roller shade apparatus 100 further includes the winding roller 31 arranged at the vehicle 1 and constantly biasing the shade sheet 33 in the winding-up direction to wind up the shade sheet 33. Further, the flexible belt 40 is deformed into the curved shape within the belt guide portion 12c when the shade sheet 33 is in the extended state. Furthermore, the flexible belt 40 is deformed into the flattened shape relative to the shade sheet 33 by the biasing force of the winding roller 31 when the shade sheet 33 is in the wound-up state. In addition, the belt guide portion 12c has the convex portion 121a projecting toward the flexible belt 40 and along the curved shape of the flexible belt 40.

According to the configuration described above, even when the flexible belt 40 may be deformed from the curved shape to the flattened shape by an external cause such as heat, the convex portion 121a makes contact with the flexible belt 40 to prevent the deformation accordingly.

According to the aforementioned first and second embodiments, the curved shape of the flexible belt 40 is the circular arc shape and the third upper wall portion 129 and the extending portion 126b have the curved surface portions 129a, 126b1, respectively, making planar contact with the flexible belt 40.

According to the configuration described above, the flexible belt 40 makes planar contact with the third upper wall portion 129 and the extending portion 126b. Accordingly, a force generating when the flexible belt 40 makes contact with the third upper wall portion 129 and the extending portion 126b may be divided to therefore appropriately prevent the flexible belt 40 from being locally deformed.

According to the aforementioned first and second embodiments, the convex surface 40a of the flexible belt 40 projects in the direction perpendicular to the surface of the shade sheet 33.

Accordingly, the flexible belt 40 is slidably supported by the belt guide portion 12c in such a way that the outer peripheral surface 40a that is the convex surface faces the surface of the shade sheet 33, therefore reducing a thickness of the electric roller shade apparatus 100 in a direction perpendicular to the surface of the shade sheet 33 (vertical direction of the vehicle 1). Accordingly, as in the first embodiment, when the electric roller shade apparatus 100 is applied to a shade apparatus for the roof panel 11 of the vehicle 1, a head clearance in the vertical direction of the vehicle 1 is prevented from being reduced.

According to the aforementioned first and second embodiments, when the central portion 41 of the convex surface 40a of the flexible belt 40 is connected to the side end portion 33a, the distal end of the side portion 33a, which is located at a slightly exterior side in the width direction, serves as a free end.

In addition, according to the configuration described above, the flexible belt 40 is formed by an elastic member. Further, when the shade sheet 33 shifts from the extended state to the wound-up state, the flexible belt 40 is deformed from the cross-sectional circular arc shape to the cross-sectional rectangular shape. Accordingly, a diameter of the shade sheet 33 and the flexible belt 40 that are wound up on the winding roller 31 is reduced. As a result, the size of the electric roller shade apparatus 100 may be reduced.

Further, according to the configuration described above, when the shade sheet 33 is wound up by the winding roller 31, a force to easily deform the flexible belt 40 from the cross-sectional arc shape to the cross-sectional rectangular shape may be exerted. As a result, the biasing force of the biasing means of the winding roller 31 is reduced.

Furthermore, according to the configuration described above, the shade sheet 33 may be slidably moved along the belt guide portion 12c while being not in contact therewith. Accordingly, even when the flexible belt 40 is sewn to the shade sheet 33 so as to be connected thereto, such sewn portion is neither worn nor damaged due to the sliding movement of the shade sheet 33 and the connection between the shade sheet 33 and the flexible belt 40 may not be released.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roller shade apparatus for a vehicle, comprising:
a shade sheet placed selectively in wound-up and extended states, the wound-up state being established to uncover a light transmitting member adapted to be mounted to the vehicle when the shade sheet is moved in an opening direction, the extended state being established to shield the light transmitting member when the shade sheet is moved in a closing direction that is in opposition to the opening direction;
a pair of guide rails extending in the opening and closing directions of the shade sheet and adapted to be arranged on the vehicle so that guide portions of the guide rails are positioned to face each other, the guide portions being arranged to guide side end portions of the shade sheet, the side end portions being provided at both side ends of the shade sheet in a width direction that is perpendicular to the opening and closing directions of the shade sheet; and
a pair of plate-shaped guide belts extending along the opening and closing directions, slidably supported by the pair of guide portions in the opening and closing directions, and connected to the respective side end portions of the shade sheet, wherein each of the guide belts is curved in the width direction, the guide belt including one surface formed into a curved shape having a convex surface, and a central portion of the convex surface in cross section in the width direction is connected to each of the side end portions, and wherein each of the guide portions includes a pair of lock portions locking side portions of the guide belt, respectively, in a condition where the convex surface of the guide belt faces a surface of the shade sheet, and the guide portion has a convex portion facing an opposite surface of the guide belt relative to the convex surface, the convex portion projecting toward the guide belt and along the curved shape of the guide belt to have a clearance relative to the guide belt, and the clearance between the guide belt and the convex portion is greater than a plate thickness of the guide belt.

2. The roller shade apparatus according to claim 1, wherein the guide portion includes a covered wall portion facing the lock portions and covering the shade sheet without contacting therewith.

3. The roller shade apparatus according to claim 1, further comprising a winding roller arranged at the vehicle and constantly biasing the shade sheet in a winding-up direction to wind up the shade sheet, wherein the guide belt is deformed into the curved shape within the guide portion when the shade sheet is in the extended state, the guide belt being deformed into a flattened shape relative to the shade sheet by a biasing force of the winding roller when the shade sheet is in the wound-up state.

4. The roller shade apparatus according to claim 1, wherein the curved shape of the guide belt is a circular arc shape and the lock portions have curved surface portions, respectively, making planar contact with the guide belt.

5. The roller shade apparatus according to claim 1, wherein the convex surface of the guide belt projects in a direction perpendicular to the surface of the shade sheet.

6. The roller shade apparatus according to claim 1, wherein when the central portion of the convex surface of the guide belt is connected to the side end portion, a distal end of the side portion, which is located at a slightly exterior side in the width direction, serves as a free end.

7. The roller shade apparatus according to claim 1, wherein the convex portion of the guide portion includes a curvature along the curved shape of the guide belt.

8. The roller shade apparatus according to claim 1, wherein the guide portion includes facing surfaces facing the side portions of the guide belt in the width direction, and a clearance between the facing surfaces and the side portions in the width direction.

9. The roller shade apparatus of claim 1, wherein each of the guide belts is configured such that each of the guide belts has a cross-sectional shape in the width direction that is deformed into a first cross-sectional curved shape in the width direction when a predetermined tensile force is applied to the shade sheet, and that is deformed into a second cross-sectional curved shape, different from the first cross-sectional curved shape, when a tensile force greater than the predetermined tensile force is applied to the shade sheet.

10. The roller shade apparatus of claim 9,
wherein each of the pair of lock portions of each guide portion includes a curved surface portion, and each of the guide portions further includes a covered wall portion facing the lock portions and covering the shade sheet;
wherein when the guide belt is in the first cross-sectional curved shape, the guide belt makes contact with the curved surface portion of the lock portions and the shade sheet does not contact the covered wall portion; and
wherein when the guide belt is in the second cross-sectional curved shape, the shade sheet makes contact with the covered wall portion.

11. A roller shade apparatus for a vehicle, comprising:
a shade sheet placed selectively in wound-up and extended states, the wound-up state being established to uncover a light transmitting member adapted to be mounted to the vehicle when the shade sheet is moved in an opening direction, the extended state being established to shield the light transmitting member when the shade sheet is moved in a closing direction that is in opposition to the opening direction;
a pair of guide rails extending in the opening and closing directions of the shade sheet and adapted to be arranged on the vehicle so that guide portions of the guide rails are positioned to face each other, the guide portions being arranged to guide side end portions of the shade sheet, the side end portions being provided at both side ends of the shade sheet in a width direction that is perpendicular to the opening and closing directions of the shade sheet; and
a pair of plate-shaped guide belts extending along the opening and closing directions, slidably supported by the pair of guide portions in the opening and closing directions, and connected to the respective side end portions of the shade sheet,
wherein each of the guide portions includes a convex portion projecting toward the guide belt, a pair of lock portions that each have a curved surface portion, and a covered wall portion facing the lock portions and covering the shade sheet;
wherein each of the guide belts is configured such that each of the guide belts has a cross-sectional shape in the width direction that is deformed into a first cross-sectional curved shape in the width direction when a predetermined tensile force is applied to the shade sheet, and that is deformed into a second cross-sectional curved shape, different from the first cross-sectional curved shape, when a tensile force greater than the predetermined tensile force is applied to the shade sheet;
wherein when the guide belt is in the first cross-sectional curved shape, the guide belt makes contact with the curved surface portion of the lock portions and the shade sheet does not contact the covered wall portion; and
wherein when the guide belt is in the second cross-sectional curved shape, the shade sheet makes contact with the covered wall portion.

\* \* \* \* \*